(12) United States Patent
Kana et al.

(10) Patent No.: US 11,379,344 B2
(45) Date of Patent: Jul. 5, 2022

(54) METHOD TO ASSURE INTEGRITY OF INTEGRATED CERTIFIED AND NON-CERTIFIED SENSORS

(71) Applicant: Honeywell International Inc., Morris Plains, NJ (US)

(72) Inventors: Zdenek Kana, Dubnany (CZ); Mark A. Ahlbrecht, Champlin, MN (US); Milos Sotak, Slavkov u Brna (CZ)

(73) Assignee: Honeywell International Inc., Charlotte, NC (US)

( * ) Notice: Subject to any disclaimer, the term of this patent is extended or adjusted under 35 U.S.C. 154(b) by 574 days.

(21) Appl. No.: 16/453,599

(22) Filed: Jun. 26, 2019

(65) Prior Publication Data

US 2020/0409820 A1    Dec. 31, 2020

(51) Int. Cl.
  *G06F 11/00* (2006.01)
  *G06F 11/36* (2006.01)
  (Continued)

(52) U.S. Cl.
  CPC .......... *G06F 11/3608* (2013.01); *G01S 19/03* (2013.01); *G01S 19/35* (2013.01);
  (Continued)

(58) Field of Classification Search
  CPC ............. G06G 11/3608; G06F 11/0781; G06F 11/3075; G06F 11/3055; G06F 11/273; G06F 11/2252
  See application file for complete search history.

(56) References Cited

U.S. PATENT DOCUMENTS 5,969,670 A * 10/1999 Kalafus ................... G01S 19/20
                                                          342/357.31
7,501,981 B2     3/2009 Rahman et al.
                 (Continued)

FOREIGN PATENT DOCUMENTS

EP       2665013 A1    11/2013
EP       2784445 A2    10/2014
                (Continued)

OTHER PUBLICATIONS

European Patent Office, "Extended European Search Report from EP Application No. 20181779.8", from Foreign Counterpart to U.S. Appl. No. 16/453,599, filed Nov. 30, 3030, pp. 1 through 12, Published: EP.

(Continued)

*Primary Examiner* — Charles Ehne
(74) *Attorney, Agent, or Firm* — Fogg & Powers LLC

(57) ABSTRACT

A method to assure integrity of integrated certified and non-certified sensors or systems comprises calculating a certified main solution filter within a first software thread in a certified partition; calculating certified sub-solution filters, and sub-sub-solution filters within the first software thread; calculating a non-certified main solution filter within a second software thread in a non-certified partition; if applicable, reusing the certified main solution filter as a non-certified sub-solution filter, and reusing the certified sub-solution filters, as non-certified sub-sub-solution filters; calculating non-certified sub-solution filters, and sub-sub-solution filters, within the second software thread; based on the certified filters, determining protection limits of the certified partition, and/or providing execution of fault detection and exclusion; based on the non-certified filters, determining protection limits of the non-certified partition, and/or providing execution of fault detection and exclusion; outputting certified solutions from the certified partition; and (Continued)

outputting non-certified solutions from the non-certified partition.

20 Claims, 3 Drawing Sheets

(51) Int. Cl.
| | | |
|---|---|---|
| *G01S 19/03* | (2010.01) | |
| *G01S 19/35* | (2010.01) | |
| *G06F 11/07* | (2006.01) | |
| *G06F 11/273* | (2006.01) | |
| *G06F 11/22* | (2006.01) | |
| *G01C 21/16* | (2006.01) | |

(52) U.S. Cl.
CPC ...... *G06F 11/0781* (2013.01); *G06F 11/2252* (2013.01); *G06F 11/273* (2013.01); *G01C 21/165* (2013.01)

(56) References Cited

U.S. PATENT DOCUMENTS

| | | | |
|---|---|---|---|
| 10,760,911 B2* | 9/2020 | Kana | G01C 21/20 |
| 2013/0124015 A1 | 5/2013 | Pangilinan et al. | |
| 2014/0019038 A1* | 1/2014 | Shehi | G01C 23/00 701/417 |
| 2018/0143650 A1* | 5/2018 | Klaus | G05D 1/02 |
| 2019/0055015 A1* | 2/2019 | Allard | B60R 16/0234 |

FOREIGN PATENT DOCUMENTS

| | | |
|---|---|---|
| EP | 3043148 A1 | 7/2016 |
| WO | 2008048949 A2 | 4/2008 |

OTHER PUBLICATIONS

Call et al., "Performance of Honeywell's Inertial/GPS Hybrid (HIGH) for RNP Operations", ION Position, Location, And Navigation Symposium, Published: IEEE, Jul. 5, 2006, pp. 244-255.

* cited by examiner

METHOD TO ASSURE INTEGRITY OF INTEGRATED CERTIFIED AND NON-CERTIFIED SENSORS

BACKGROUND

For various fields, such as urban air mobility (UAM) applications, as well as other commercial aviation applications, certified navigation systems are assumed to be required. On the other hand, the smooth autonomous operation of such systems require high accuracy navigation outputs, which raises the need to also integrate non-certified sensors or other aiding devices. In addition, size, weight, power (SWAP) and price requirements are fairly strict for such systems, requiring just a single, highly integrated navigation platform.

SUMMARY

A method to assure integrity of integrated certified and non-certified sensors or systems comprises calculating a certified main solution filter within a first software thread in a certified partition; calculating one or more certified sub-solution filters, and sub-sub-solution filters within the first software thread in the certified partition; calculating a non-certified main solution filter within a second software thread in a non-certified partition; if applicable, reusing the certified main solution filter as a non-certified sub-solution filter, and reusing the certified sub-solution filters, as non-certified sub-sub-solution filters; calculating one or more non-certified sub-solution filters, and sub-sub-solution filters, within the second software thread in the non-certified partition; based on the certified filters, determining one or more protection limits of the certified partition, and/or providing execution of fault detection and exclusion; based on the non-certified filters, determining one or more protection limits of the non-certified partition, and/or providing execution of fault detection and exclusion; outputting one or more certified solutions from the certified partition; and outputting one or more non-certified solutions from the non-certified partition.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
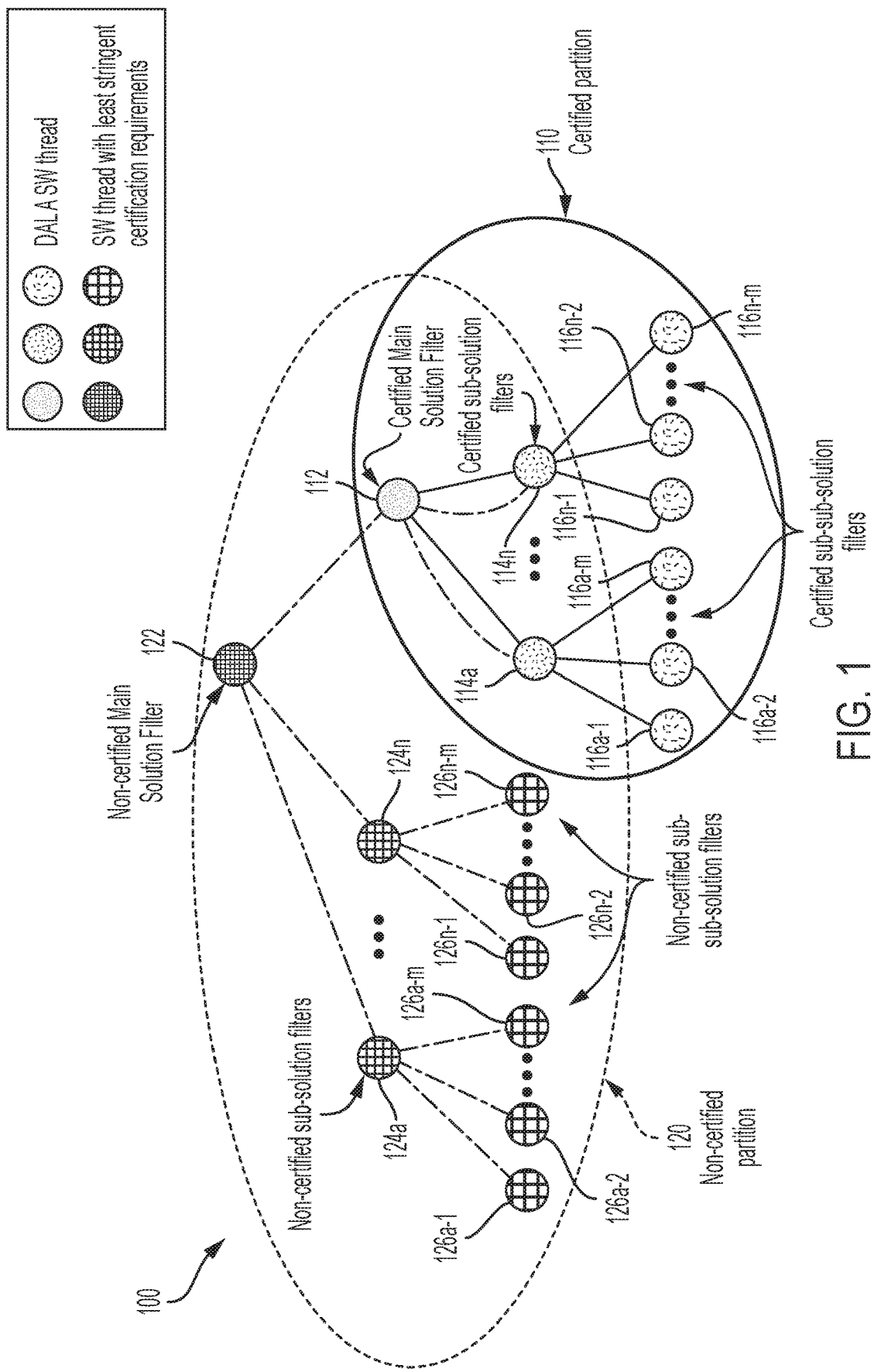
FIG. 1 is a functional diagram of an exemplary method to assure integrity of integrated certified and non-certified sensors or systems that provide measurements, according to an exemplary implementation.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method to assure integrity of integrated certified and non-certified sensors and systems is described herein. Sensors/systems that are certified meet special regulatory or industry standards and as such, allow special operations or use (for example, precision approach for aircraft) just by meeting that standard. Non-certified sensors/systems do not meet such standards and would not allow for special operations or use, even if they provided the exact same function. The present approach defines how certified and non-certified sensors or other aiding devices can be integrated within a single navigation system, assuring both high accuracy and integrity.

The present approach applies an updated solution separation methodology, where the "basic" solution separation methodology is applied twice onto two partitions, which respectively include certified and non-certified solutions, with some of the sub-filters being shared. In the basic solution separation methodology, a system determines a full solution and one or more sub-solutions, where the full solution is calculated based on information acquired from a set of information sources and the sub-solutions are calculated based on information acquired from subsets of the set of information sources. Using the full solution and the sub-solutions, a system may determine the integrity of the full solution.

For example, the solution separation methodology described above may be used to determine the integrity of a position solution calculated from information acquired from navigation satellites. For instance, the main position solution may incorporate a set of pseudoranges from available satellites that are integrated with inertial sensor measurements, where the sub-solutions are based on a subset of the pseudoranges from the available satellites. The system may then determine the protection limits for the main position solution based on differences or separations between the main position solution and the sub-solutions.

In the updated solution separation methodology described herein, a non-certified main filter integrates all measurements and has its own suite of sub-, sub-sub filters, etc. in a non-certified partition. The number of sub-filter layers depends on the fault modes to be mitigated (i.e., single fault, dual faults) and if the exclusion is required. A certified main filter integrates all certified measurements has a suite of its own sub- and sub-sub filters, but also, at the same time, the certified main filter can be a (sub-)sub filter of the non-certified main filter. In addition, some of the certified and non-certified sub-sub filters can be in common in between the certified and non-certified partition.

It should be noted that if more than one failure mode is to be mitigated (e.g., dual faults) by solution separation or if fault exclusion is required, the number of common certified and non-certified filters can be increased.

As used herein, "integrity" is a measure of the level of trust that can be placed in the correctness of the information supplied by a system. As used herein, a "certified" partition/solution is operative to integrate/combine only certified navigation information (e.g., global navigation satellite system (GNSS) measurements, etc.). As used herein, a "non-certified" partition/solution is operative to integrate/combine both certified and non-certified navigation information (e.g., camera-based navigation aiding, etc.).

Each solution separation partition (certified vs. non-certified) has its own probabilities distributions and other integrity monitoring settings and their solutions can be outputted separately.

The certified main filter and all certified (sub-)sub filters can be computed within a software thread with high certification (high integrity) requirements being put upon, such as that required by DO-178C Design Assurance Level (DAL) A for safety critical software. All the other filters, including the non-certified main filter and its sub-solution and sub-sub-solution filters, which are not also the certified (sub-)sub filters at the same time, can be computed as part of the software in which least stringent certification (low integrity) requirements are put upon (e.g., that required by DO-178C Design Assurance Level (DAL) from level B to level E).

It should be understood that up to multiples of certified and non-certified filters can be implemented in a system applying present method. The present approach provides the benefit of reducing the computational load in a navigation system, in that information does not need to be replicated in every filter and processing resources are shared.

It should be understood that only part of the resulting navigation system software applying the present method needs to be certified, such as against DAL A, significantly decreasing the certifications costs.

The present method is particularly suited for use in urban air mobility (UAM) applications, as well as other commercial aviation applications, where certified but highly integrated, cost efficient and high-performance solutions are required, and limitations on weight and space create need for combining sensors with a certification basis and sensors without that certification basis.

Further details of various embodiments are described hereafter with reference to the drawings.

FIG. 1 illustrates a functional diagram 100 of the present method to assure integrity of a navigation solution integrating certified and non-certified sensors or systems that provide measurements, according to an exemplary implementation. In functional diagram 100, a single non-certified sensor/aiding is assumed to simplify the description.

The functional diagram 100 includes a certified partition 110 comprising a certified main solution filter 112 operative to process a set of certified measurements, and one or more certified sub-solution filters 114a, . . . 114n. Each of the certified sub-solution filters 114a, . . . 114n is operative to process all but one measurement from the set of certified measurements.

If fault exclusion is required by the system for certified partition 110, then sub-sub-solution filters are provided, wherein each certified sub-sub-solution filter is operative to process all but two measurements from the set of certified measurements. Each certified sub-sub-solution filter set is coupled to a respective certified sub-solution filter. For example, a set of certified sub-sub-solution filters 116a-1, 116a-2, . . . 116a-m can be coupled to certified sub-solution filter 114a. Likewise, another set of certified sub-sub-solution filters 116n-1, 116n-2, . . . 116n-m can be coupled to certified sub-solution filter 114n.

The certified main solution filter 112, the certified sub-solution filters 114, and the certified sub-sub-solution filters 116 can all be computed within a software (SW) thread having the highest certification requirements, such as DAL A.

The functional diagram 100 also includes a non-certified partition 120 comprising a non-certified main solution filter 122 operative to process a set of non-certified measurements and the set of certified measurements, as non-certified main solution filter 122 is coupled to certified main solution filter 112.

If fault detection is required for non-certified partition 120, non-certified sub-solution filters 124a, . . . 124n are provided. Each of non-certified sub-solution filters 124a, . . . 124n is operative to process all but one measurement from the sets of non-certified and certified measurements.

If fault exclusion is required by the system for non-certified partition 120, two or more sets of non-certified sub-sub-solution filters are provided, with each non-certified sub-sub-solution filter operative to process all but two measurements from the sets of non-certified and certified measurements. Each non-certified sub-sub-solution filter set is coupled to a respective non-certified sub-solution filter. For example, a set of non-certified sub-sub-solution filters 126a-1, 126a-2, . . . 126a-m can be coupled to non-certified sub-solution filter 124a. Likewise, another set of non-certified sub-sub-solution filters 126n-1, 126n-2, . . . 126n-m can be coupled to non-certified sub-solution filter 124n.

The non-certified main solution filter 122, the non-certified sub-solution filters 124, and the certified sub-sub-solution filters 126 can all be computed within a software thread having the least stringent certification requirements, such as that required by DO-178C Design Assurance Level (DAL) from level B to level E.

Depending on the number of non-certified measurements, the certified main solution filter 112 can also be operative as a sub-solution filter of the non-certified main solution filter 122, and the certified sub-solution filters 144a, . . . 114n can also be operative as sub-sub-solution filters of the non-certified main solution filter 122.

Each of certified partition 110 and non-certified partition 120 are configured to respectively output one or more certified solutions (high integrity) and one or more non-certified solutions (high accuracy).

When an Extended Kalman filter is used as the filtering technology, the linearization point can be taken from the certified main solution filter so that the certified partition is completely independent from the non-certified measurements.

Figure 2:
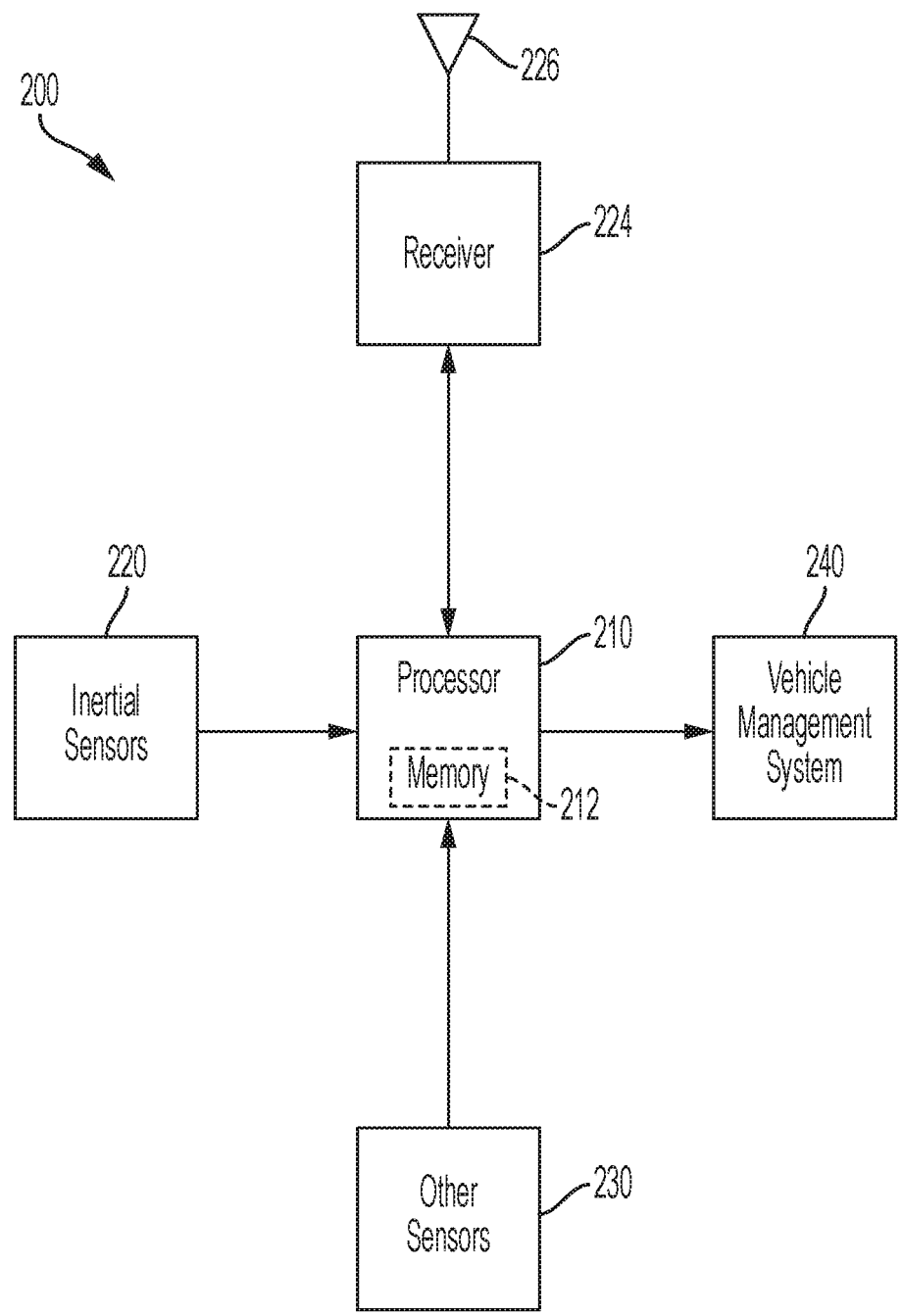
FIG. 2 is a block diagram of a navigation system which can implement methods to assure integrity of integrated certified and non-certified sensors or systems, according to one embodiment.

FIG. 2 illustrates a navigation system 200 according to one embodiment, which can implement the methods to assure integrity of integrated certified and non-certified sensors or systems as described herein. The navigation system 200 may be mounted to a vehicle, such as an aircraft, a spacecraft, an automobile, or the like. The navigation system 200 may acquire navigation information from one or more different sources. To process the acquired navigation information, navigation system 200 may include at least one processor 210 and at least one memory unit 212 operatively coupled to processor 210.

In some embodiments, navigation system 200 may acquire navigation information that includes inertial motion information and global navigation satellite system (GNSS) measurements. To acquire the inertial motion information, the navigation system 200 may include one or more inertial sensors 220 that measure and sense the inertial motion of the vehicle containing navigation system 200. To acquire the GNSS measurements, the navigation system 200 may include a satellite receiver 224 with at least one antenna 226 that receives satellite signals from one or more GNSS satellites. Additionally, navigation system 200 may include one or more other sensors 230, which may provide additional sensor data to processor 210. Examples of other sensors 230 may include an altitude sensor, an electro-optical sensor, an image sensor, a magnetometer, radio frequency (RF) ranging beacons, or the like.

During operation, inertial sensors 220 provide inertial measurements to processor 210. In addition, satellite receiver 224 may receive satellite signals such as GNSS signals, extract position and time data from the satellite signals, and provide pseudorange measurements to processor 210. The one or more other sensors 230 can provide additional data to processor 210, such as altitude data, image data, magnetic data, ranges measurements, or the like.

For example, a certified main solution filter in navigation system 200 can have all satellites in view, whereas each certified sub-solution filter can have each but one respective satellite in view, and each certified sub-sub-solution filter eliminates two of the satellites. Similarly, a non-certified main solution filter in navigation system 200 can have all satellites in view and all non-certified measurements, whereas each non-certified sub-solution filter can have each but one respective satellite in view and non-certified measurements, and each non-certified sub-sub-solution filter eliminates two of the satellites and/or non-certified measurements.

From the inertial measurements, the pseudorange measurements, and any additional data, processor 210 can derive a position, velocity, and attitude solution. The processor 210 may also use the pseudorange measurements to detect satellite transmitter faults and to determine a worst-case error, or protection limit. The processor 210 may then provide the protection limit, along with the position of certified solution to a vehicle management system 240. The vehicle management system 240 may compare the provided protection limit to an alarm limit for the particular vehicle containing navigation system 200. The processor 210 may also use the pseudorange measurements to exclude the faulty satellite transmitter.

From the inertial measurements, the pseudorange measurements, any additional data, and non-certified measurements, processor 210 can derive a position, velocity, and attitude solution. The processor 210 may also use the pseudorange and non-certified measurements to detect their faults and to determine a worst-case error, or protection limit. The processor 210 may then provide the protection limit, along with the position of non-certified solution to vehicle management system 240. The vehicle management system 240 may compare the provided protection limit to an alarm limit for the particular vehicle containing navigation system 200. The processor 210 may also use the pseudorange and non-certified measurements to exclude the faulty measurements.

Figure 3:
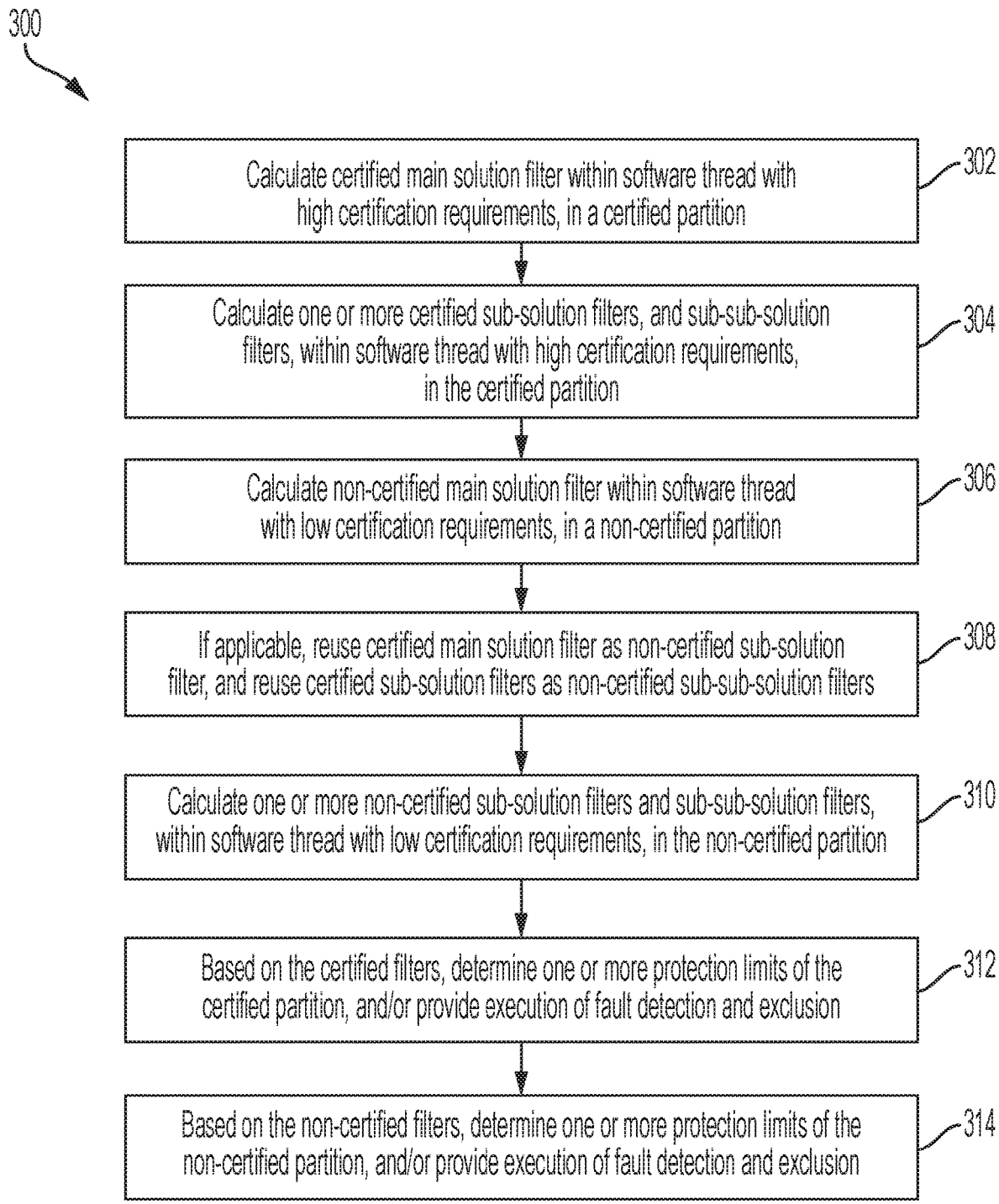
FIG. 3 is a flow diagram of an exemplary method to assure integrity of integrated certified and non-certified sensors or systems.

FIG. 3 is a flow diagram of an exemplary method 300 to assure integrity of integrated certified and non-certified sensors or systems. As described herein, method 300 may be performed by processor 210 of navigation system 200. However, method 300 may be performed by a different processor on navigation system 200, or by another processor that is part of a system in communication with navigation system 200.

Initially, method 300 calculates a certified main solution filter within a software thread with high certification requirements (such as DAL A) in a certified partition (block 302). The method 300 also calculates one or more certified sub-solution filters, sub-sub-solution filters, etc., within the software thread with high certification requirements, in the certified partition (block 304). In addition, method 300 calculates a non-certified main solution filter within a software thread with low certification requirements (e.g., open source), in a non-certified partition (block 306).

If applicable, method 300 reuses the certified main solution filter as a non-certified sub-solution filter, and reuses the certified sub-solution filters, as non-certified sub-sub-solution filters (block 308). The method 300 calculates one or more non-certified sub-solution filters and sub-sub-solution filters, within the software thread with low certification requirements, in the non-certified partition (block 310).

Based on the certified filters, method 300 determines one or more protection limits of the certified partition, and/or provides execution of fault detection and exclusion (block 312). Based on the non-certified filters, method 300 determines one or more protection limits of the non-certified partition, and/or provides execution of fault detection and exclusion (block 314). The fault detection and exclusion is based on solution separation methodology and is well known to those skilled in the art. The protection limits of the certified partition can be computed based on differences between the certified solutions of the certified main solution filter and certified sub-solutions of the certified sub-solution filters. The protection limits of the non-certified partition can be computed based on differences between the non-certified solutions of the non-certified main solution filter and non-certified sub-solutions of the non-certified sub-solution filters. The method 300 then outputs one or more certified solutions from the certified partition, and one or more non-certified solutions from the non-certified partition.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present system and method.

The present method can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the method described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a method to assure integrity of integrated certified and non-certified sensors or systems, the method comprising: calculating a certified main solution filter within a first software thread in a certified partition; calculating one or more certified sub-solution filters, and sub-sub-solution filters within the first software thread in the certified partition; calculating a non-certified main solution filter within a second software thread in a non-certified partition; if applicable, reusing the certified main solution filter as a non-certified sub-solution filter, and reusing the certified sub-solution filters, as non-certified sub-sub-solution filters; calculating one or more non-certified sub-solution filters, and sub-sub-solution filters, within the second software thread in the non-certified partition; based on the certified filters, determining one or more protection limits of the certified partition, and/or providing execution of fault detection and exclusion; based on the non-certified filters, determining one or more protection limits of the non-certified partition, and/or providing execution of fault detection and exclusion; outputting one or more certified solutions from the certified partition; and outputting one or more non-certified solutions from the non-certified partition.

Example 2 includes the method of Example 1, wherein the first software thread in the certified partition has high certification requirements.

Example 3 includes the method of Example 2, wherein the first software thread in the certified partition has certification requirements comprising design assurance level (DAL) A.

Example 4 includes the method of any of Examples 1-3, wherein the second software thread in the non-certified partition has low or no certification requirements.

Example 5 includes the method of Example 4, wherein the second software thread in the non-certified partition has certification requirements comprising DAL B, DAL C, DAL D, or DAL E.

Example 6 includes the method of any of Examples 1-5, wherein the certified partition and the non-certified partition are implemented in a processor in operative communication with a navigation system on a vehicle.

Example 7 includes the method of Example 6, wherein the navigation system comprises: one or more inertial sensors operative to measure and sense inertial motion of the vehicle; a satellite receiver operative to receive satellite signals from one or more global navigation satellite system (GNSS) satellites; and one or more other sensors including an altitude sensor, an electro-optical sensor, an image sensor, radio frequency (RF) ranging beacons, or a magnetometer.

Example 8 includes the method of Example 7, wherein: the one or more inertial sensors provide inertial measurements of the vehicle to the processor; the satellite receiver extracts position and time data from the satellite signals, and provides pseudorange measurements to the processor; and the one or more other sensors provide additional data to the processor, including altitude data, image data, range data, or magnetic data.

Example 9 includes the method of any of Examples 6-8, wherein the vehicle comprises an aircraft, a spacecraft, or a ground vehicle.

Example 10 includes the method of any of Examples 1-9, wherein the one or more protection limits of the certified partition are computed based on differences between certified solutions of the certified main solution filter and certified sub-solutions of the one or more certified sub-solution filters.

Example 11 includes the method of any of Examples 1-10, wherein the one or more protection limits of the non-certified partition are computed based on differences between non-certified solutions of the non-certified main solution filter and non-certified sub-solutions of the one or more non-certified sub-solution filters.

Example 12 includes a system for applying a method to assure integrity of integrated certified and non-certified sensors or systems providing measurements, the system comprising: a certified partition comprising a certified main solution filter operative to process a set of certified measurements; one or more certified sub-solution filters, wherein each certified sub-solution filter is operative to process all but one measurement from the set of certified measurements; and if fault exclusion is required, one or more sets of certified sub-sub-solution filters, wherein each certified sub-sub-solution filter is operative to process all but two measurements from the set of certified measurements; and a non-certified partition comprising a non-certified main solution filter operative to process a set of non-certified measurements and the set of certified measurements; if fault detection is required for the non-certified partition, one or more non-certified sub-solution filters, wherein each non-certified sub-solution filter is operative to process all but one measurement from the sets of non-certified and certified measurements; and if fault exclusion is required for the non-certified partition, one or more sets of non-certified sub-sub-solution filters, wherein each non-certified sub-sub-solution filter is operative to process all but two measurements from the sets of non-certified and certified measurements; wherein, depending on the number of non-certified measurements, the certified main solution filter is also operative as a sub-solution filter of the non-certified main solution filter, and the certified sub-solution filters are also operative as sub-sub-solution filters of the non-certified main solution filter; wherein each of the certified partition and the non-certified partition respectively output one or more certified solutions and one or more non-certified solutions.

Example 13 includes the system of Example 12, wherein the certified main solution filter is operative within a first software thread in the certified partition with high certification requirements.

Example 14 includes the system of Example 13, wherein the first software thread in the certified partition has certification requirements comprising DAL A.

Example 15 includes the system of any of Examples 12-14, wherein the non-certified main solution filter is operative within a second software thread in the non-certified partition with low or no certification requirements.

Example 16 includes the system of Example 15, wherein the second software thread in the non-certified partition has certification requirements comprising DAL B, DAL C, DAL D, or DAL E.

Example 17 includes the system of any of Examples 12-16, wherein the certified partition and the non-certified partition are implemented in a processor in operative communication with a navigation system on a vehicle.

Example 18 includes the system of Example 17, wherein the navigation system comprises: one or more inertial sensors operative to measure and sense inertial motion of the vehicle; a satellite receiver operative to receive satellite signals from one or more GNSS satellites; and one or more other sensors including an altitude sensor, an electro-optical sensor, an image sensor, RF ranging beacons, or a magnetometer.

Example 19 includes the system of any of Examples 17-18, wherein the vehicle comprises an aircraft, a spacecraft, or a ground vehicle.

Example 20 includes a computer program product comprising: a non-transitory computer readable medium having instructions stored thereon executable by a processer to perform a method to assure integrity of integrated certified and non-certified sensors or systems, the method comprising: calculating a certified main solution filter within a first software thread in a certified partition; calculating one or more certified sub-solution filters, and sub-sub-solution filters within the first software thread in the certified partition; calculating a non-certified main solution filter within a second software thread in a non-certified partition; if applicable, reusing the certified main solution filter as a non-certified sub-solution filter, and reusing the certified sub-solution filters, as non-certified sub-sub-solution filters; calculating one or more non-certified sub-solution filters, and sub-sub-solution filters, within the second software thread in the non-certified partition; based on the certified filters, determining one or more protection limits of the certified partition, and/or providing execution of fault detection and exclusion; based on the non-certified filters, determining one or more protection limits of the non-certified partition, and/or providing execution of fault detection and exclusion; outputting one or more certified solutions from the certified partition; and outputting one or more non-certified solutions from the non-certified partition.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method to assure integrity of integrated certified and non-certified sensors or systems, the method comprising:
   calculating a certified main solution filter within a first software thread in a certified partition;
   calculating one or more certified sub-solution filters, and sub-sub-solution filters within the first software thread in the certified partition;
   calculating a non-certified main solution filter within a second software thread in a non-certified partition;
   if applicable, reusing the certified main solution filter as a non-certified sub-solution filter, and reusing the certified sub-solution filters, as non-certified sub-sub-solution filters;
   calculating one or more non-certified sub-solution filters, and sub-sub-solution filters, within the second software thread in the non-certified partition;
   based on the certified filters, determining one or more protection limits of the certified partition, and/or providing execution of fault detection and exclusion;
   based on the non-certified filters, determining one or more protection limits of the non-certified partition, and/or providing execution of fault detection and exclusion;
   outputting one or more certified solutions from the certified partition; and
   outputting one or more non-certified solutions from the non-certified partition.

2. The method of claim 1, wherein the first software thread in the certified partition has high certification requirements.

3. The method of claim 2, wherein the first software thread in the certified partition has certification requirements comprising design assurance level (DAL) A.

4. The method of claim 1, wherein the second software thread in the non-certified partition has low or no certification requirements.

5. The method of claim 4, wherein the second software thread in the non-certified partition has certification requirements comprising DAL B, DAL C, DAL D, or DAL E.

6. The method of claim 1, wherein the certified partition and the non-certified partition are implemented in a processor in operative communication with a navigation system on a vehicle.

7. The method of claim 6, wherein the navigation system comprises:
   one or more inertial sensors operative to measure and sense inertial motion of the vehicle;
   a satellite receiver operative to receive satellite signals from one or more global navigation satellite system (GNSS) satellites; and
   one or more other sensors including an altitude sensor, an electro-optical sensor, an image sensor, radio frequency (RF) ranging beacons, or a magnetometer.

8. The method of claim 7, wherein:
   the one or more inertial sensors provide inertial measurements of the vehicle to the processor;
   the satellite receiver extracts position and time data from the satellite signals, and provides pseudorange measurements to the processor; and
   the one or more other sensors provide additional data to the processor, including altitude data, image data, range data, or magnetic data.

9. The method of claim 6, wherein the vehicle comprises an aircraft, a spacecraft, or a ground vehicle.

10. The method of claim 1, wherein the one or more protection limits of the certified partition are computed based on differences between the certified solutions of the certified main solution filter and certified sub-solutions of the one or more certified sub-solution filters.

11. The method of claim 1, wherein the one or more protection limits of the non-certified partition are computed based on differences between the non-certified solutions of the non-certified main solution filter and non-certified sub-solutions of the one or more non-certified sub-solution filters.

12. A system for applying a method to assure integrity of integrated certified and non-certified sensors or systems providing measurements, the system comprising:
   a certified partition comprising:
      a certified main solution filter operative to process a set of certified measurements;
      one or more certified sub-solution filters, wherein each certified sub-solution filter is operative to process all but one measurement from the set of certified measurements; and
      if fault exclusion is required, one or more sets of certified sub-sub-solution filters, wherein each certified sub-sub-solution filter is operative to process all but two measurements from the set of certified measurements; and
   a non-certified partition comprising:
      a non-certified main solution filter operative to process a set of non-certified measurements and the set of certified measurements;
      if fault detection is required for the non-certified partition, one or more non-certified sub-solution filters, wherein each non-certified sub-solution filter is operative to process all but one measurement from the sets of non-certified and certified measurements; and
      if fault exclusion is required for the non-certified partition, one or more sets of non-certified sub-sub-solution filters, wherein each non-certified sub-subsolution filter is operative to process all but two measurements from the sets of non-certified and certified measurements;

wherein, depending on the number of non-certified measurements, the certified main solution filter is also operative as a sub-solution filter of the non-certified main solution filter, and the certified sub-solution filters are also operative as sub-sub-solution filters of the non-certified main solution filter;

wherein each of the certified partition and the non-certified partition respectively output one or more certified solutions and one or more non-certified solutions.

13. The system of claim 12, wherein the certified main solution filter is operative within a first software thread in the certified partition with high certification requirements.

14. The system of claim 13, wherein the first software thread in the certified partition has certification requirements comprising design assurance level (DAL) A.

15. The system of claim 12, wherein the non-certified main solution filter is operative within a second software thread in the non-certified partition with low or no certification requirements.

16. The system of claim 15, wherein the second software thread in the non-certified partition has certification requirements comprising DAL B, DAL C, DAL D, or DAL E.

17. The system of claim 12, wherein the certified partition and the non-certified partition are implemented in a processor in operative communication with a navigation system on a vehicle.

18. The system of claim 17, wherein the navigation system comprises:

one or more inertial sensors operative to measure and sense inertial motion of the vehicle;

a satellite receiver operative to receive satellite signals from one or more global navigation satellite system (GNSS) satellites; and one or more other sensors including an altitude sensor, an electro-optical sensor, an image sensor, radio frequency (RF) ranging beacons, or a magnetometer.

19. The system of claim 17, wherein the vehicle comprises an aircraft, a spacecraft, or a ground vehicle.

20. A computer program product comprising:

a non-transitory computer readable medium having instructions stored thereon executable by a processer to perform a method to assure integrity of integrated certified and non-certified sensors or systems, the method comprising:

calculating a certified main solution filter within a first software thread in a certified partition;

calculating one or more certified sub-solution filters, and sub-sub-solution filters within the first software thread in the certified partition;

calculating a non-certified main solution filter within a second software thread in a non-certified partition;

if applicable, reusing the certified main solution filter as a non-certified sub-solution filter, and reusing the certified sub-solution filters, as non-certified sub-sub-solution filters;

calculating one or more non-certified sub-solution filters, and sub-sub-solution filters, within the second software thread in the non-certified partition;

based on the certified filters, determining one or more protection limits of the certified partition, and/or providing execution of fault detection and exclusion;

based on the non-certified filters, determining one or more protection limits of the non-certified partition, and/or providing execution of fault detection and exclusion;

outputting one or more certified solutions from the certified partition; and outputting one or more non-certified solutions from the non-certified partition.

* * * * *